UNITED STATES PATENT OFFICE.

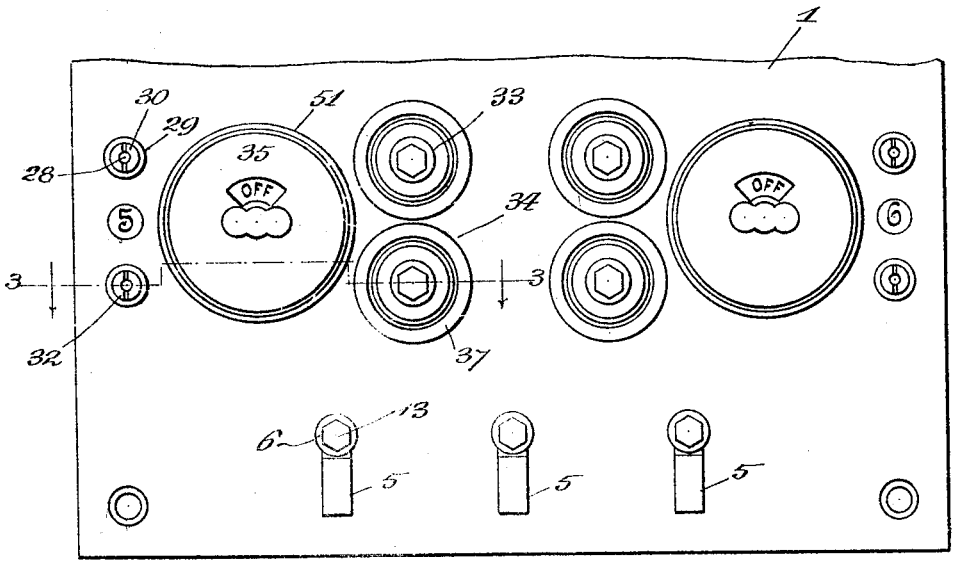

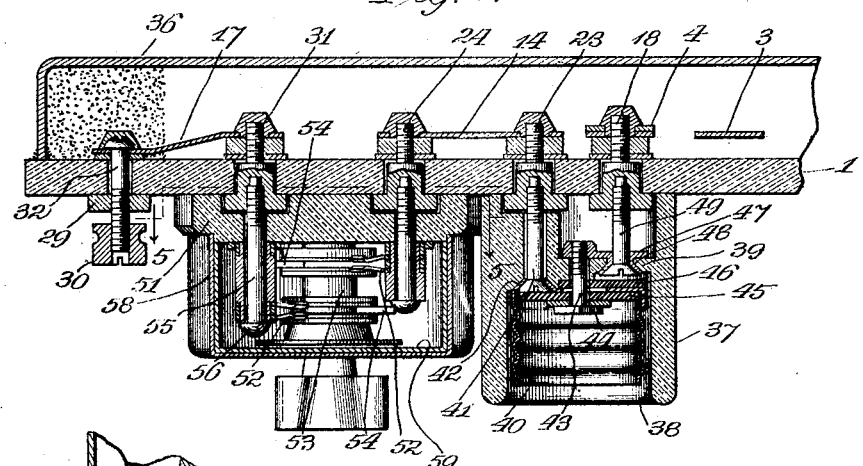
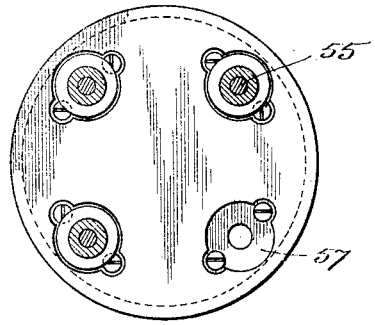
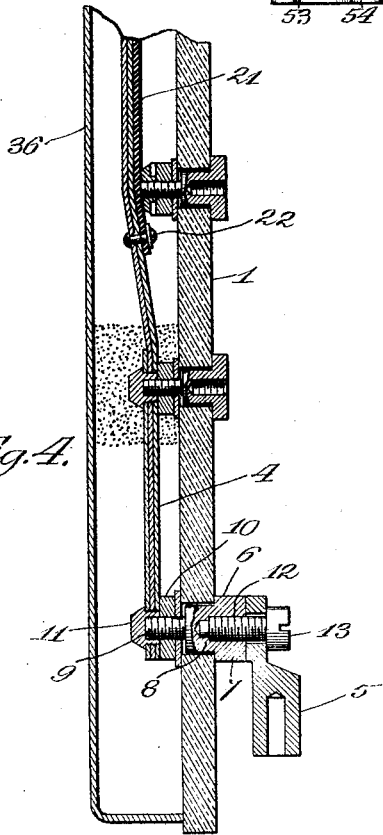

HENRY F. STARRETT, OF CHICAGO, ILLINOIS, ASSIGNOR, BY MESNE ASSIGNMENTS, TO STARRETT MANUFACTURING COMPANY.

PANEL-BOARD WITH SWITCH.

1,198,677.   Specification of Letters Patent.   Patented Sept. 19, 1916.

Application filed June 13, 1911. Serial No. 632,585.

*To all whom it may concern:*

Be it known that I, HENRY F. STARRETT, a citizen of the United States, residing at Chicago, in the county of Cook and State of Illinois, have invented new and useful Improvements in Panel-Boards with Switches, of which the following is a full, clear, concise, and exact description, reference being had to the accompanying drawing, forming a part of this specification.

My invention relates to improvements in panel-board construction and has particular reference to means for removably mounting the snap switches on the face of the board.

For the purpose of disclosing my invention, I have illustrated one embodiment thereof in the accompanying drawings, in which—

Figure 1 is a front elevation of a portion of a panel-board embodying my invention; Fig. 2 is a rear elevation thereof with the backing and casing left off; Fig. 3 is a transverse section on the line 3—3 of Fig. 1; Fig. 4 is a longitudinal section on the line 4—4 of Fig. 2 with the snap switch and other equipment left off the face of the board; and Fig. 5 is a sectional view on the line 5—5 of Fig. 3.

In the construction of the panel-board illustrated, I provide a base 1 which is formed of some suitable insulating material, preferably slate. This slate base, however, is of much less thickness in cross-section than the slate bases heretofore used in panel-board construction, due to certain characteristics of the particular form of panel-board shown and described.

The bus bars and branch bus bars are arranged on the rear of the base and are connected with suitable anchor studs which extend through the face of the base and provide means for attaching thereto the various electrical equipment mounted on the face of the base. In the present construction I have illustrated the bus bars and branch bus bars as being arranged for a three wire connection with oppositely disposed branch bus bars. For the purpose of illustration, I have only shown two sets of these branch bus bars, but it will be understood that they may be multiplied and as many as desired used.

The bus-bars 2, 3 and 4 for the three wire connections are mounted on the back of the board, and are preferably formed of thin ribbons of copper. These bus-bars may be formed of a plurality of ribbons placed one on top of the other to form laminations. The laminations decrease in length from bottom to top so that the cross sectional area of the bus-bars decreases so that at their bases the bus-bars have a large cross sectional area and a large current carrying capacity and toward their top this cross sectional area decreases and the current carrying capacity correspondingly decreases as the necessity for a large current carrying capacity decreases. This is preferably obtained by varying the lengths of the various laminations whereby the cross-sectional area of the bus-bars may be varied. Each bus-bar is connected with a terminal connector 5 which is mounted on the face of the base and is removably connected to an anchor stud 6. The anchor stud comprises a headed portion 7, a shank portion 8 which extends through an opening in the board and at its lower end 9 is threaded to receive a clamping nut 10 for clamping and holding the stud in position on the board. The shank 8 is connected to the bus-bar by a casting process. After the stud 6 has been placed in position and the nut 10 screwed tight, the bus-bar, which has previously been punched, is placed over the shank 9 and a mold placed over the lower end of the shank. A suitable material, which is preferably brass, is poured into the mold and forms a cast head 11 on the end of the shank which practically integrally connects the bus-bar with the shank and forms a complete metallic connection between the bus-bar and the stud. The anchor stud is provided in its front face with a screw-threaded socket 12 into which fits a securing screw 13 which holds the terminal connector in position. I have described the anchor stud 6 in detail, as this stud is not only used for the purpose of mounting the terminal connections, but is also used for mounting the various equipment, such as switches, fuse receptacles and the like, on the front of the board.

The branch bus bars for one branch circuit comprise the conductors 14, 15, 16 and 17 which like the bus-bars are preferably formed of thin copper ribbons. If the current carrying capacity of one ribbon is not sufficient, they may be laminated if desired. The bus-bar 4 is connected to the anchor stud 18. The bus-bar 3 is connected to an anchor stud 19 which is placed in alinement with the anchor stud 18 and is connected to the bus-bar by a branch bus bar 20. As the bus-bar 4 passes over the anchor stud 19 and a portion of the branch bus bar 20, which by the way may be used for connecting the bus-bar 3 with the anchor stud for the opposite branch bus bar, I interpose between the bus-bar 4 and the anchor stud 19 an insulating strip 21 which is preferably of mica and which is preferably riveted to the bus-bar as at 22 to hold it in position. The branch bus bar 14 connects a pair of anchor studs 23 and 24. The branch bus bar 15 connects a pair of anchor studs 25 and 26. The branch bus bar 16 connects an anchor stud 27 with a binding post 28. This binding post comprises a threaded screw which passes through an opening in the branch bus bar and through an opening in the base and has a clamping nut 29 holding the screw in position. A suitable thumb nut 30 is also mounted on the screw to secure one of the branch wires thereto. The branch bus bar 17 connects an anchor stud 31 with a binding post 32. The anchor studs 19 and 25 are adapted to secure in position a fuse receptacle 33, while the anchor studs 18 and 23 are adapted to secure in position a fuse receptacle 34. The anchor studs 24, 26, 27 and 31 are adapted to secure in position a double pole switch 35.

After the various electrical connections are made on the back of the base 1, I secure on the back thereof a casing 36 which incloses all of the electrical parts and is filled with an insulating compound in which all of the current carrying parts on the back of the board are embedded.

The snap switches and fuse receptacles are mounted on the face of the board and as all of the fuse receptacles are of the same construction, I will confine my description to only one of the same; likewise with respect to the snap switches.

The fuse receptacle illustrated comprises a cylindrical porcelain casing 37 having a socket 38 formed therein and a web 39. Arranged within the socket 38 is a threaded shell 40 which is held in position by a connecting screw 41. The bottom of the shell 40 has a hole punched therein and the side walls of this opening are tapered as at 42 to fit in a tapered recess formed in the web 39. The head of the screw 41 which passes through the web 39 draws the tapered walls 42 into the cone-shaped socket of the web and securely holds the shell 40 in position and secures a good electrical contact between the shell and screw. This connecting screw 41 is adapted to enter the screw-threaded socket in the face of the anchor stud 23. The center contact for the fuse receptacle comprises a threaded screw 43 which is headed, as at 44, to form a center contact. Between the head 44 and the bottom of the threaded shell 40 I preferably interpose an insulating washer 45 to insulate the screw 44 from the shell; beneath the bottom of the shell and a portion of the web 39 I interpose a second insulating washer 46. One end of the screw 44 engages in a threaded socket formed in a conducting plate 47 which is provided with an off-set portion having an integral sleeve member 48 adapted to extend through an opening in the web 39 and be flanged over to hold the plate 47 in position. A conducting and securing screw 49 passes through this sleeve and engages in a threaded socket in the anchor stud 18. It will thus be seen that the fuse receptacle is electrically connected with the bus bars and branch bus bars on the rear of the board and is mechanically held in position by the screws 41 and 49 and is readily removable from the face of the board without disturbing any of the electrical connections and without disturbing or removing from position the panel-board.

In order that the switch may be likewise removable from the face of the board without disturbing any electrical connections and without disturbing the board, I secure a switch which is of the type known as a double pole switch in position by connecting the same to the four anchor studs 24, 26, 27 and 31. The switch mechanism of the switch may be of any well known type of double pole switch adapted for this class of work and is provided with a plurality of hollow conductor studs 5. These studs are rigidly mounted on an insulating base 51 and carry the stationary switch contacts 52. A suitable rotating switching mechanism 53 is provided which carries the movable contact members 54 of the switch. It is unnecessary herein to describe the mechanism for obtaining the snap action of the switch, as this may be any of the well known mechanisms now on the market and forms no particular part of my invention. The four conducting posts 50, as before stated, are hollow, and securing screws such as 55 having heads 56 pass down through the posts 50 and engage in the threaded sockets of the anchor studs, whereby the switch is not only electrically connected with the bus bars and branch bus bars on the back of the panel-board, but is mechanically secured in position. The insulating base 51 of the switch is preferably recessed, as at 57, to receive the heads of the anchor posts. The switch, as is usual in switches of this character, is provided with an inclosing casing 58 lined with an insulating material 59.

While I have shown and described one embodiment of my invention, it will be understood that various modifications and changes may be made therein without departing from the spirit of the invention as set forth in the accompanying claims.

Having thus described my invention, what I claim as new and desire to secure by Letters Patent is:

1. A panel-board comprising a flat insulating base having all of the bus bars and branch bus bars permanently mounted on the back thereof, anchor studs permanently connected to said bus bars holding the same in position on said base and projecting through said base to the front thereof, an insulating base, contacts mounted on said base, a movable member of a switch mounted on said base and arranged to coöperate with said contacts, and screws for removably mechanically securing said second base in position upon the first base and electrically connecting the contacts on said second base with the bus bars and branch bus bars arranged to engage said anchor studs.

2. A panel-board comprising a flat insulating base having all of the bus bars and branch bus bars permanently mounted on the back thereof, anchor studs for securing said bus bars in position and projecting through said base to the face thereof, a secondary insulating base, switch contacts mounted on said secondary base, a movable member of a switch mounted on said base, and means for removably supporting said secondary base in position on the first-mentioned base and electrically connecting the switch contact members with said anchor studs.

3. A panel-board comprising a flat insulating base having all of the bus bars and branch bus bars permanently mounted on the rear thereof, anchor studs for securing said bus bars in position on said base and projecting through said base to the front thereof, a secondary base, switch contacts mounted on said secondary base, a movable switch member mounted on said secondary base and coöperating with said switch contacts, and means accessible from the front of said first-mentioned base for removably securing said first-mentioned base on the second base and for electrically connecting the switch contacts with said anchor studs.

4. A panel-board comprising a flat insulating base having all of the bus bars and branch bus bars permanently mounted on the rear thereof, anchor studs for securing said bus bars in position on said base and arranged to extend through said base to the face thereof, a secondary insulating base, hollow posts mounted on said base, switch contacts mounted on said posts, a movable switch member mounted on said secondary base and coöperating with said switch contacts, and means extending through said hollow posts and removably engaging said anchor studs to support said secondary base on the first base and electrically connect the switch contacts with the anchor studs.

5. A panel-board comprising a flat insulating base having all of the bus bars and branch bus bars permanently mounted on the back thereof, anchor studs for securing the bus bars in position on said base and extending through said base to the face thereof, a secondary insulating base recessed on its bottom face to receive at least two of the heads of said anchor studs, switch contacts mounted on said secondary base, a movable switch member mounted on said second base, and means removably engaging said studs for mechanically securing said secondary base in position on the primary base and for electrically connecting the switch contacts with the anchor studs.

6. A panel-board comprising a flat insulating base having all of the bus bars and branch bus bars permanently mounted on the back thereof, anchor studs for securing said bus bars in position on said base arranged to extend through the base to the front face thereof and having screw-threaded sockets in their faces, a secondary insulating base, switch contacts mounted on said secondary base, a movable switch member mounted on said secondary base, and screws passing through the secondary base and engaging the threaded sockets in the anchor studs for removably securing said secondary base in position on the primary base and electrically connecting the switch contacts with the anchor studs.

7. A panel-board comprising a flat insulating base having all of the bus bars and branch bus bars permanently mounted on the back thereof, anchor studs for securing said bus bars in position extending through said base to the front face thereof and having screw-threaded sockets in their front faces, a secondary insulating base, hollow supporting posts secured on said secondary base, switch contacts mounted on said posts, a movable switch member mounted on said secondary base, and screws passing through said hollow posts and engaging in the threaded sockets of the anchor studs for removably securing said secondary base to the primary base and electrically connecting the contacts on said secondary base with the anchor studs.

8. A panel-board comprising a flat insulating base having all of the bus bars and branch bus bars permanently secured on the back of said base, a plurality of anchor studs for securing said bus bars on the base extending through the base and headed over the face of the base, a secondary insulating base having a flat bottom arranged to engage the face of said primary base and having recesses formed in the bottom to accommodate at least two of said anchor studs, switch contacts mounted on said secondary base, a movable switch member mounted on said secondary base, and means for removably securing said secondary base on the primary base and electrically connecting the switch contacts with the anchor studs.

9. In a panel board the combination with an insulating base, bus bars all arranged on the rear of said base, circuit controlling switches comprising a base, a stationary and movable contact mounted on said switch base, and switch securing means for electrically connecting the contacts of the switch with the bus bars and mechanically securing the switch base on the panel board base, the bus bars being secured in position on the back of the base independently of the switches, whereby the switches may be removed without disturbing the bus bars.

10. In a panel board the combination with an insulating base, bus bars arranged on the rear face of said base, fuse receptacles comprising an insulating base, center and threaded shell contacts mounted on said base, fuse receptacle securing means extending through said base electrically connecting one of the contacts of the fuse receptacle with said bus bars, a switch removably mounted on said base having stationary and movable contacts and an insulating base, means for removably securing said switch in position on said base, means for electrically connecting one of the terminals of the switch with one of the contacts of the fuse receptacles, and means for connecting the opposite terminal of the switch with a binding post, said bus bars being held in place independently of the switch and fuse receptacles to permit the removal of the switch and fuse receptacles without disturbing the bus bars.

11. In a panel board the combination with an insulating base, bus bars arranged on the rear face of said base, a fuse receptacle mounted on the front face of said base comprising an insulating fuse receptacle base, a threaded shell and center contact mounted on said base, fuse receptacle securing means extending through said base electrically connecting at least one of the contacts of the fuse receptacles with at least one of the bus bars, a switch mounted on the front face of said base having stationary and removable contacts, electrical conductors extending between one of the stationary contacts of the switch and one of the contacts of said fuse receptacles and a second electrical conductor extending between a second stationary contact of the switch and a binding post all mounted on said base, the bus bars of said base being supported in position on the rear of the base independently of the securing means for the switch and fuse receptacle, whereby either the fuse receptacle or switch or both may be removed without displacing the bus bars.

In witness whereof, I have hereunto subscribed my name in the presence of two witnesses.

HENRY F. STARRETT.

Witnesses:
WALTER M. FARMER,
MABEL REYNOLDS.

Copies of this patent may be obtained for five cents each, by addressing the "Commissioner of Patents, Washington, D. C."